United States Patent [19]
Dahmen et al.

[11] 4,093,542
[45] June 6, 1978

[54] FLOCCULATING AGENT COMPRISING WATER-IN-OIL EMULSION OF H-ACTIVE POLYMER CARRYING FORMALDEHYDE AND AMINE RADICALS

[75] Inventors: Kurt Dahmen, Rheydt; Wolfgang Hubner, Kempen; Eduard Barthell, Krefeld, all of Germany

[73] Assignee: Chemische Fabrik Stockhausen & Cie, Bakerfad, Germany

[21] Appl. No.: 538,428

[22] Filed: Jan. 2, 1975

Related U.S. Application Data

[63] Continuation-in-part of Ser. No. 485,474, Jul. 3, 1974, abandoned.

[30] Foreign Application Priority Data

Jul. 4, 1973    Germany .............................. 2333927

[51] Int. Cl.$^2$..B01D 21/01; C08G 12/06; C08L 61/32
[52] U.S. Cl............210/54; 260/29.4 UA; 260/29.6 R; 260/72 R
[58] Field of Search ....... 260/29.4 UA, 72 R, 29.6 N; 210/54 A, 54 C, 54 R

[56] References Cited

U.S. PATENT DOCUMENTS

| 2,328,901 | 9/1943 | Grimm et al. ...................... 260/72 R |
| 3,539,535 | 11/1970 | Wisner ................................ 260/72 R |
| 3,790,529 | 2/1974 | Fujimura et al. .................. 260/72 R |
| 3,875,097 | 4/1975 | Sedlak ................................ 260/72 R |
| 4,010,131 | 3/1977 | Phillips et al. ............... 260/29.4 UA |

Primary Examiner—Allan Lieberman
Attorney, Agent, or Firm—Burgess, Dinklage & Sprung

[57] ABSTRACT

A flocculation, sedimentation, dehydration or retention composition comprising a dispersion of about 10 to 50% concentration by weight of a polymeric Mannich base in a mixture of water and a water-insoluble liquid, the Mannich base comprising an H-active polymer carrying radicals of a reaction with formaldehyde and a primary or secondary alkyl- or hydroxyalkylamine wherein the alkyl groups have up to about 18 carbon atoms. The amine is preferably dimethylamine or diethylamine and is used in approximately the same molar amount as the formaldehyde. The polymer preferably comprises acrylamide units and the polymerization may be effected either before or after reaction with the formaldehyde and amine.

8 Claims, No Drawings

FLOCCULATING AGENT COMPRISING WATER-IN-OIL EMULSION OF H-ACTIVE POLYMER CARRYING FORMALDEHYDE AND AMINE RADICALS

This application is a continuation-in-part of Application Ser. No. 485,474, filed July 3, 1974, now abandoned.

This application relates to the production of polymeric flocculating agents.

Water soluble polymeric substances in powder form used as flocculation, sedimentation, dehydration and retention adjuvants are known. Thus, in U.S. Pat. No. 3,539,535 there is described a method of obtaining solid, cationically active polymers, in which a polyacrylic amide suspension in an organic solution is prepared without the use of an emulsifier. This unstable suspension is then reacted with formaldehyde and secondary amines to the Mannich base, and the latter is isolated in solid form by precipitation with suitable solvents.

It is known that the greater are the molecular weights of the water soluble polymeric substances in powder form, the more effective they are. The high molecular weights, however, make the preparation of ready-to-use solutions of the water-soluble, powdered substances time-consuming and difficult, i.e., one is not always assured that the solution ready for use will be particle-free. In addition, the use of powdered products entails technical difficulty, and expensive apparatus is required for the continuous, constant proportioning thereof.

All of these difficulties are obviated if liquid or at least pumpable products are used, and efficiency requires that the content of active substance in such liquid or pumpable products must be as great as possible.

According to German DOS Nos. 2,048,664, 2,054,523, 2,156,858, 2,206,564 and 1,546,344, the preparation and use of aqueous solutions of polyacrylic amide Mannich bases is known, such bases being obtained by the aminomethylation of the acid amide groups of dissolved polymeric products with formaldehyde and amine. However, as a consequence of the high degree of polymerization of the polyacrylic amide or of the state of this polymer in aqueous solution, as the case may be, only relatively dilute solutions, i.e., solutions containing 5 to 10% by weight, can be prepared by these methods. The solutions even at this low content have a high viscosity. The viscous liquid products prepared by the above methods are therefore difficult to pump or to handle, so that their use in a number of areas is restricted in spite of their good effectiveness.

In the case of long storage, and also in attempts to dehydrate these products or to prepare them with a larger content of active substance, it has been found that they cross-link to form largely insoluble and thus ineffective substances.

In a process described in German DOS No. 2,163,246, the production of polyacrylic amide Mannich bases is accomplished by further processing the 5% to 10% aqueous polymer solutions obtained by the previously described methods. Specifically, by the addition of polyvalent electrolytes the polymers are caused to precipitate from the dilute solution but the separation of the aqueous phase and the drying of the product is, again, expensive.

Also known are solid, free-flowing flocculation compositions formed in accordance with German DAS 1,442,398 from polyacrylic amide and the reaction product of dialkylammonium salts and paraformaldehyde, which become cationically active in the dissolved state in a medium having a suitable pH value.

It is accordingly an object of the invention to provide an inexpensive process for the preparation of pumpable solutions of flocculating agents which have a high concentration of active material.

These and other objects and advantages are realized in accordance with the present invention pursuant to which there is provided a flocculation, sedimentation, dehydration or retention composition comprising a dispersion of about 10 to 50% concentration by weight of a polymeric Mannich base in a mixture of water and a water-insoluble liquid, the Mannich base comprising an H-active polymer carrying radicals of a reaction with formaldehyde and a primary or secondary alkyl- or hydroxyalkylamine wherein the alkyl groups have up to about 18 carbon atoms.

These compositions, preferably having a concentration of about 25 to 35% by weight, may be obtained by dispersing in a water-in-oil emulsion a water-soluble, hydrogen-active substance of high molecular weight in a concentration of about 10 to 50% by weight, and reacting the dispersion thus obtained, under the conditions of the Mannich Reaction, with monomeric and/or polymeric formaldehyde, preferably with the use of an aqueous formaldehyde solution emulsified in the organic phase, and a primary or secondary amine. At the same time, the possibility exists of controlling the content of the polymeric, water-soluble Mannich base in the end product by using amounts of formaldehyde and amine which are equivalent or subequivalent to the dispersed polymeric hydrogen-active compounds. It has additionally been found that the products of the invention are likewise obtained by subjecting water-soluble monomeric Mannich bases to polymerization in a water-in-oil emulsion.

Substances which can be dispersed in a water-in-oil emulsion and which are accessible to the Mannich reaction are hydrogen-active compounds, especially acrylic amide and methacrylamide as well as polymers or copolymers thereof with other polymerizable compounds. Especially suited are polymers and copolymers of acrylamide such as polyacrylamide and copolymers of acrylamide with acrylonitrile, salts of acrylic acid, esters of acrylic acid, styrene, vinyl acetate, vinyl chloride, vinyl pyrrolidone, vinyl imidazole and/or vinyl pyridines.

Amines suited for the reaction include those which carry active hydrogen such as amines of the formula R—NH$_2$ and/or R—NH—R' wherein R and R' are alkyl or hydroxyalkyl radicals with 1 to 18 carbon atoms. For the purposes of the invention those amines are preferred which have straight chains of not more than about 8, preferably not more than about 6 carbon atoms. Suitable amines, for example, include methylamine, ethylamine, propylamine, butylamine, pentylamine, hexylamine, heptylamine and octylamine. Of the straight chain amines suited for the practice of the invention the secondary amines are preferred. Especially preferred secondary amines include, for example, dimethylamine and diethylamine. Diethanolamine is an example of a hydroxyalkylamine suitable for practice of the invention.

For the preparation of the stabilized system for the dispersion of the water-soluble, hydrogen-active monomers, polymers and/or copolymers, a water-in-oil emulsion is used. Aliphatic and/or aromatic hydrocarbons are usable as the oily phase. The water-in-oil emulsion is obtained by the use of emulsifiers of a suitable HLB number, especially sorbitan esters and other oil-soluble fatty acid esters, such as fatty acid polyglycol esters.

It is a special advantage of the products obtained by the above-described process that the concentration of active substance amounts to about 10 to 50%, generally about 30%, by weight, that the dispersions are stable, and that the preparation of solutions of these dispersions ready for use can be accomplished without great technical expenditure, e.g., by means of a proportioning pump, the polymeric product going rapidly and completely into solution upon dilution with water.

The process of the invention offers appreciable advantages over the above-described previously known processes.

The products prepared by the method of the invention have technical applications in a variety of areas. They can be used as sedimentation or flocculation adjuvants in heterogeneous liquid-solid systems, as for example in the sedimentation of aqueous sludges containing minerals, and as dehydration and retention agents. In this manner also the use of such water-in-oil suspensions is possible in systems containing water, but containing mainly nonpolar liquids.

The manufacturing process and the application of the products thereof will now be further explained with the aid of the following examples wherein all parts are by weight unless otherwise expressed.

The organic, hydrophobic phase (I) used in Examples 1 to 10, which is an important component of the product, may be obtained, for example, from: 138 parts n-paraffin of the following characteristics:

| Boiling range: | 195–225° C |
| --- | --- |
| Density: | 0.740 |
| Percentage of hydrocarbons in the mixture: | |
| $C_{10}$ | to 8 wt. % |
| $C_{11}$ | to 38 wt. % |
| $C_{12}$ | to 37 wt. % |
| $C_{13}$ | to 16 wt. % |

18 parts sorbitan monooleate and
12 parts stearic acid polyglycol ester containing ten moles of ethylene oxide per mole of stearic acid,
by mixing the parts together.

EXAMPLE 1

Preparation 23.1 parts of 60% aqueous dimethylamine solution emulsified in 16.9 parts of organic phase(I) are stirred into 140 parts of a polyacrylamide latex prepared by radical polymerization in a known manner from 3,135 parts of acrylic amide dissolved in 2,660 parts water, the whole emulsified in 4,104 parts of organic phase(I). After about 60 minutes a second emulsion, consisting of 23.1 parts of aqueous 40% formaldehyde solution and 16.9 parts of organic phase(I) are added in portions with stirring, such that the temperature of the mixture is not caused by the heat of the reaction to exceed 40° C. The reaction has ended after 4 hours and the product is obtained as a fluid, colorless but turbid polymer suspension having a polymer-Mannich base content of 27.9% by weight.

EXAMPLE 2

Preparation 200 parts of the same polymer latex as in Example 1 are mixed with 9.0 parts of a 60%, aqueous dimethylamine solution, 8.7 parts of diethylamine and 0.3 parts water in 12 parts of organic phase(I), and then reacted with 17.9 parts of 40% aqueous formaldehyde solution in 12 parts of organic phase(I) in the same manner as described in Example 1. A polyacrylamide-Mannich base suspension is obtained having a content of 32.7% water-soluble polymers.

EXAMPLE 3

Preparation 136.3 parts of the same polyacrylamide latex as in Example 1 are reacted with a total of 45.2 parts of a 60% dimethylamine solution, in 28.2 parts of organic phase (I) and a total of 45.2 parts of aqueous 40% formaldehyde solution in 28.2 parts of organic phase (I), the procedure being such that first one-third of the amine emulsion is stirred into the polymer latex and, 20 minutes later, with continued stirring, one-third of the aldehyde emulsion is added. The temperature of the mixture in the meantime is not to exceed 40° C. After a reaction time of an additional 30 minutes the second and then final thirds of the amine and aldehyde emulsions are completely reacted separately in the same manner using the same timing. A fluid, clear product is obtained, which is soluble in water. Active substance content: 26.3% by weight.

EXAMPLE 4

Preparation 66 parts of diethylamine are added to 128 parts of acrylic amide dissolved in 108 parts of water. 67.5 parts of aqueous 40% formaldehyde solution are added to the mixture in portions such that the temperature in the mixture is not increased above 40° C by the heat of the reaction. 50 parts of organic phase(I) and 11 parts of water are added to 63 parts of the resulting solution of carbamoylmethylamine and acrylic amide in a ratio of approximately 0.6 : 0.4 in water. The mixture is stirred to form an emulsion and is saturated with nitrogen. A redox system, consisting of 0.023 wt.-% ammonium peroxydisulfate, 0.023 wt.-% potassium bisulfite and 0.004 wt.-% (with respect to the monomer) of iron(II) sulfate, is added, and, by polymerization for 10 hours at 35° C, a suspension of polyacrylamide and Mannich base is obtained. Active substance content: 28.2% by weight.

EXAMPLE 5

300 parts of 31.35% polyacrylamide latex produced according to Example 1 are reacted incrementally at room temperature with a water-in-oil emulsion produced by combining 138.5 parts of diethanolamine, 50 parts of water, 99.5 parts of 40% formalin and 148 parts of organic phase (I) with cooling. After a reaction time of 5 hours there is formed a cationically active polymer suspension of 33.7% concentration.

EXAMPLE 6

In the same manner as described in Example 5, 200 parts of a polyacrylamide latex is reacted with a water-in-oil emulsion formed of 77.5 parts of 40% methylamine, 66.0 parts of 40% formalin and 120.0 parts of organic phase (I). The product contains 22.8% of active material.

EXAMPLE 7

A copolymer latex is prepared in known manner by radical polymerization of 75.0 parts of acrylamide and 25.0 parts of dimethylaminoethyl methacrylate hydrochloride, the copolymer being emulsified in 140.85 parts of water and 117.5 parts of organic phase (I). 300 parts of this 28% copolymer latex are reacted with 5 parts of a water-in-oil emulsion made from 50 parts of 60% dimethylamine and 40 parts of organic phase (I). The pH of the resulting latex rises to 8.0. 20 parts of 60% dimethylamine, 20 parts of 40% formaldehyde and 20 parts of organic phase (I) are mixed with cooling and this mixture, which is a water-in-oil emulsion, is added dropwise to the copolymer latex. After 5 hours there is formed a polymeric Mannich base suspension of 28.5% concentration.

EXAMPLE 8

99.5 parts of 60% dimethylamine solution and 99.5 parts of 40% formalin are combined with cooling and emulsified by stirring with 96 parts of organic phase (I). The resulting water-in-oil emulsion is added with stirring of the reaction mixture to 316 parts of a 31% polymer latex, which latex is produced by copolymerizing 95 parts of acrylamide and 5 parts of acrylonitrile in a water-in-oil emulsion according to the procedure of Example 1. The reaction mixture is maintained with stirring for 5 hours at room temperature whereupon there is formed a cationically active product of 28,3% concentration.

EXAMPLE 9

In manner analogous to Example 1, there is prepared a water-in-oil emulsion from 67.5 parts of 40% formalin, 67,5 parts of 60% dimethylamin and 100,0 parts of organic phase (I). The emulsion is added with stirring to a polymer latex produced by radical polymerization of a monomer emulsion comprising 80.0 parts of acrylamide and 70.3 of 2-vinyl-5-pyridine and quaternizing with 9.7 parts of dimethylsulfate, the latex also containing 240 parts of water and 350 parts of reaction phase (I). There forms a cationically active polymer suspension having a concentration of 16.8%

EXAMPLE 10

A copolymer latex is produced from 20 parts of acrylamide, 7.8 parts of vinylpyrrolidone, 50.0 parts of water and 74.4 parts of organic phase (I). 152 Parts of this latex are reacted at room temperature with stirring with a water-in-oil emulsion prepared by mixing 10.6 parts of 60% dimethylamine, 10.6 parts of 40% formalin and 15.7 parts of organic phase (I) with cooling. After 5 hours of reaction there is formed a 19.0% suspension of the Mannich base.

EXAMPLE 11

The products made by the method of the invention were tested as sedimentation agents in flocculation experiments. The flocculation performance of polyacrylamide-Mannich base mixtures in aqueous solution was tested by determining the settling time after adding them to aqueous clay suspensions which had been prepared by mixing kaolin with water in the conventional manner and had been adjusted with $Al_2(SO_4)_3$ solution to a pH of approximately 4.8. The results are set forth in Table I:

Table I

| Product | Time (sec.) | Product | Time (sec.) |
|---|---|---|---|
| None | 180 | per Example 6 | 9,3 |
| per Example 1 | 11,7 | per Example 7 | 10,4 |
| per Example 2 | 13,8 | per Example 8 | 9,1 |
| per Example 3 | 11,6 | per Example 9 | 11,6 |
| per Example 5 | 15,3 | per Example 10 | 12,7 |

Table I: Flocculation effect on a clay suspension containing 20 g of solids per liter plus $Al_2(SO_4)_3$ additive, product in 0.1% solution; concentration 4 ppm. On the performance of the tests, see H. Akyol and M. Neven: Chemie-Ing.-Technik 39 (1967) 172.

EXAMPLE 12

In the same manner, polyacrylamide-Mannich base suspensions are usable in the process of the clarification of titanium extraction solutions—so-called "black solutions"— which represent an intermediate in the production of titanium dioxide pigments from ilmenite or ore slags.

7.5 ml of an 0.1% solution of the product of Example 3 is added to one liter of titanium extraction solution. After the addition of the flocculation agent, the specimen is shaken for 15 seconds and transferred to a one-liter measuring cylinder.

The activity manifests itself in a rapid flocculation; settling speed: 6 meters per hour. The flocculation effect can also be judged on the basis of the gray filter scale values listed in Table II and on the basis of the flocculation quality, the product of Example 3 being compared with a commercial flocculation agent based on trimethylammoniumethyl methacrylate which had been used formerly in the clarification of "black solutions."

Table II

| Flocculation agent | Gray filter scale (residue in mg in 50 ml of supernatant solution) | | |
|---|---|---|---|
| | After 30 | 60 | 120 min. |
| Product of Example 3 | 9 | 7 | 5 |
| Product based on trimethylammoniumethyl methacrylate | 11 | 10 | 8 |

EXAMPLE 13

The studies described hereinafter will serve to explain the applicability of the products as dehydration and retention agents in the manufacture of paper.

Starting out with standardized cellulose suspensions of the following composition:

| Bleached cellulose, spruce and beech 70:30 | |
|---|---|
| Concentration: | 3 grams per liter |
| Fineness of grind | 69° S.R. |
| Pigmentation: | 25% china clay with respect to cellulose |
| Sizing: | 1% resin glue acidified with 3% $Al_2(SO_4)_3$ to pH 6.5 to 6.8 | the rate of dehydration was measured as the change in the fineness of grind in degrees by the Schopper-Riegler method (° S.R.) as a function of the amount of product added, and the retention capacity of these products was measured by gravimetric determination of the solid content in the discharge of a sheet former ("Rapid-Kothen"). The results are summarized in Table III.

| Adjuvant | Dehydration tests Fineness of grind (° SR) upon the addition of: | | | Retention test Solid content of screen water | | |
|---|---|---|---|---|---|---|
| | 100 ppm | 200 ppm | 300 ppm | 100 ppm | 200 ppm | 300 ppm |
| Product of Example 1 | 57 | 53 | 47 | 156 | 132 | 129 |
| Product of Example 7 | 59 | 55 | 50 | 161 | 140 | 135 |
| Copolymer of Acrylic amide and trimethyl-ammoniumethyl-methacrylate | 60 | 58 | 54 | 176 | 152 | 146 |
| Without additive 69° SR | | | | | | |

It is found that the products prepared in accordance with the invention are effective under these experimental conditions, which are largely in accordance with the testing methods used in paper technology. Since the products are furthermore very fluid and therefore easy to handle, i.e., easy to proportion and easily soluble, they can be preferentially used in the manufacture of paper.

EXAMPLE 14

The described products can be used equally well in the dehydration of communal sludges. Dehydration test using activated sludge:
Solid content: 8.3%

| Dehydration agent | Amount added (g/m³) | Solids in discharge (%) | Concentrate Appearance | Extinction (× 100) |
|---|---|---|---|---|
| Product of Example No. 1 | 93 | 31.1 | white | 20 |
| Copolymer based on acrylic amide trimethylammo-niumethylmeth-acrylate | 220 | 30.2 | very turbid | 100 |
| Product of Example No. 6 | 105 | 32,4 | white | 22 |
| Product of Example No. 7 | 98 | 31,4 | white | 20 |

As can be seen in the foregoing examples, the formaldehyde and amine are employed in approximately equimolar amounts. The formaldehyde is present in about 0.1 to 1.1 and preferably about 0.25 to 1.0 times the molar amount of the H-active monomer units, e.g. acrylamide or methacrylamide.

The molecular weight of the polymeric material desirably exceeds about 50,000 and preferably exceeds about 100,000. As employed in the appended claims, formaldehyde embraces polymers thereof such as trioxane.

It will be appreciated that the instant specification and examples are set forth by way of illustration and not limitation, and that various modifications and changes may be made without departing from the spirit and scope of the present invention.

We claim:

1. A flocculation, sedimentation, dehydration or retention composition comprising a stable dispersion of about 10 to 50% concentration by weight of a polymeric Mannich base in a mixture of water, a water-insoluble liquid and a quantity of an emulsifier of a suitable HLB number effective to produce a stable water-in-oil emulsion, the Mannich base comprising an H-active polymer carrying carbonamide groups reacted with formaldehyde and a primary or secondary alkyl or hydroxyalkyl amine wherein the alkyl groups have up to about 18 carbon atoms, said formaldehyde and said amine being employed in the reaction in approximately equimolar amounts, and said formaldehyde being present in at least about 0.1 times the molar amount of the carbonamide groups.

2. A composition according to claim 1, wherein said H-active polymer is an acrylamide polymer.

3. A composition according to claim 1, wherein said amine is dimethylamine or diethylamine.

4. A composition according to claim 3, wherein said water-insoluble liquid is an aliphatic or aromatic hydrocarbon or a mixture of aliphatic and aromatic hydrocarbons, said H-active polymer is polyacrylamide and is present in a concentration of about 25 to 35% by weight, and the formaldehyde is present in about 0.1 to 1.1 times the molar amount of the acrylamide monomer units.

5. A process for making a composition according to claim 1 comprising suspending in a mixture of water, a water-insoluble liquid, an H-active carbonamide polymer and a quantity of an emulsifier of a suitable HLB number effective to form a stable water-in-oil emulsion, and adding thereto formaldehyde and a primary or secondary alkyl- or hydroxyalkylamine wherein the alkyl groups have up to about 18 carbon atoms, the formaldehyde being employed in at least about 0.1% times the molar amount of the carbonamide groups.

6. A process according to claim 5, wherein said water-insoluble liquid is an aliphatic or aromatic hydrocarbon or a mixture of aliphatic and aromatic hydrocarbons and the water is emulsified therein, said H-active polymer is an acrylamide polymer, and the amount of formaldehyde is about 0.1 to 1.1 times the molar amount of the acrylamide monomer units.

7. A process for making a composition according to claim 1 comprising reacting an H-active ethylenically unsaturated polymerizable monomeric amide with formaldehyde and a primary or secondary alkyl- or hydroxyalkylamine in water, adding a water-insoluble liquid to form a stable water-in-oil emulsion and effecting polymerization of said monomer.

8. The process for clarifying an aqueous liquid having material suspended therein comprising mixing said aqueous liquid with a composition according to claim 1, and allowing said mixture to settle, whereby the suspended material settles out more rapidly than in the absence of said composition.

* * * * *